Feb. 28, 1933.  H. C. ROHLFS  1,899,588
LAMINATED GLASS
Filed Jan. 18, 1930

Fig. 1.

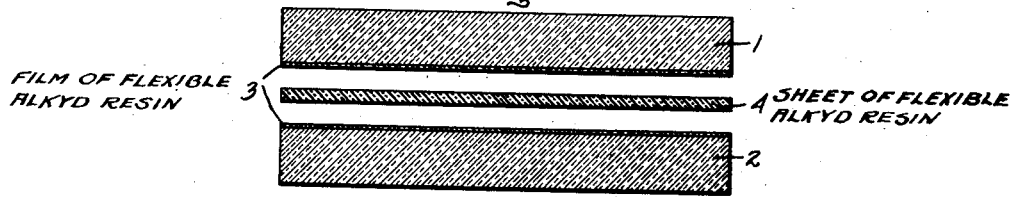

FILM OF FLEXIBLE ALKYD RESIN 3
SHEET OF FLEXIBLE ALKYD RESIN 4

Fig. 2.

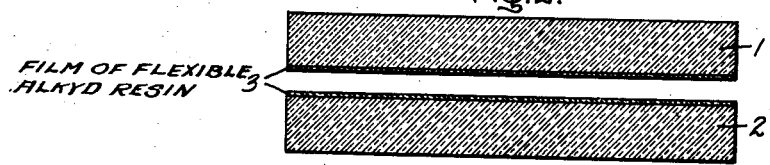

FILM OF FLEXIBLE ALKYD RESIN 3

Fig. 3.

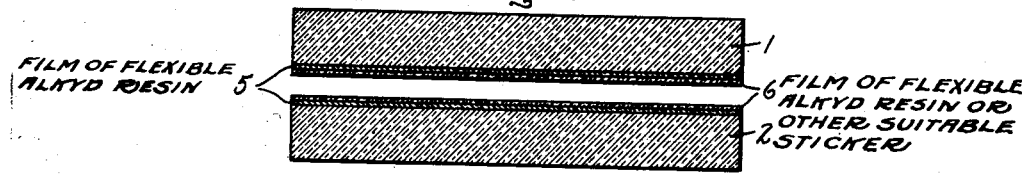

FILM OF FLEXIBLE ALKYD RESIN 5
FILM OF FLEXIBLE ALKYD RESIN OR OTHER SUITABLE STICKER 6

Fig. 4.

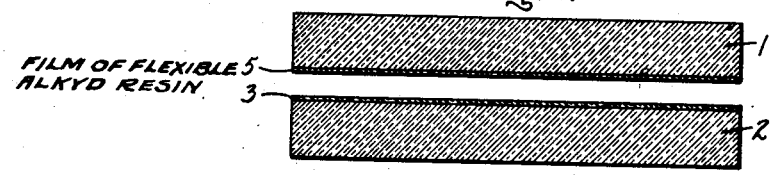

FILM OF FLEXIBLE ALKYD RESIN 5 3

Fig. 5.

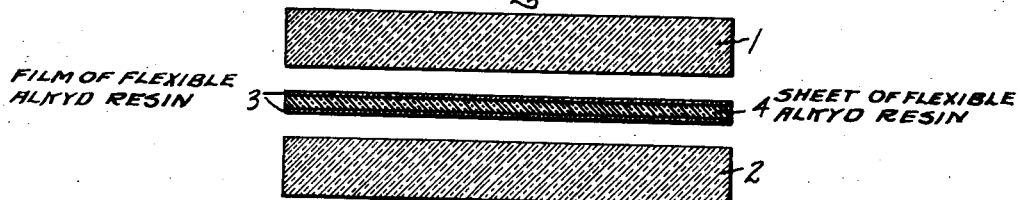

FILM OF FLEXIBLE ALKYD RESIN 3
SHEET OF FLEXIBLE ALKYD RESIN 4

Fig. 6.

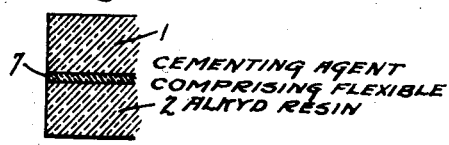

CEMENTING AGENT COMPRISING FLEXIBLE ALKYD RESIN 7

Inventors.
Harry C. Rohlfs,
by Charles E. Tuller
Their Attorney

Patented Feb. 28, 1933

1,899,588

UNITED STATES PATENT OFFICE

HARRY C. ROHLFS, OF SCHENECTADY, NEW YORK, ASSIGNOR TO GENERAL ELECTRIC COMPANY, A CORPORATION OF NEW YORK

LAMINATED GLASS

Application filed January 18, 1930. Serial No. 421,832.

This invention relates to laminated glass and the provision of a novel process and product in reference thereto.

While this invention relates generally to the art of making laminated glass it is primarily concerned with the production of a product possessing strength, non-shatterable qualities, and which will not discolor in use so that vision therethrough is obstructed, and a product which is so made that the laminations thereof are firmly and solidly united by a cementing agent which possesses advantages superior to prior and known cementing agents used for this purpose.

Heretofore it has been known that laminated glass may be produced by making a composite structure comprising two or more sheets of glass and a sheet or sheets of some material such as celluloid or pyroxylin which cements the laminations of glass together. There are several reasons why such structure has been objectionable, among which may be mentioned as a principal objection the discoloration and deterioration due to the action of light or heat on the cementing agent and hence obstruction in visibility.

In accordance with the present invention, it has been discovered that laminated glass may be produced which will have all the desirable qualities necessary for such a product if a resin of the alkyd type is employed as the cementing agent, especially certain modified types of alkyd resins. As is known alkyd resins include all those complexes resulting primarily from the interreaction of a polyhydric alcohol and a polybasic acid with or without other reacting ingredients.

Referring to the accompanying drawing which forms part of the present application, Fig. 1 is a diagrammatic sectional view of a form of the invention showing two sheets of glass having their facing surfaces coated with a film of an alkyd resin and having therebetween a sheet of alkyd resin;

Fig. 2 is a view similar to Fig. 1 showing a modification in which the cementing agent consists solely of films of alkyd resin;

Fig. 3 is a view similar to Fig. 1 showing still another form of the invention;

Fig. 4 is also a view similar to Fig. 1 illustrating a further modified form of the invention;

Fig. 5 is a view similar to Fig. 1 showing a still further form of the invention; and Fig. 6 is a fragmentary diagrammatic sectional view showing the finished product.

In accordance with the present invention, the process for producing the laminated glass structure may be carried out as follows:

The surfaces of two glass plates, 1 and 2, of desired thickness are first cleaned of all foreign matter, particularly grease spots. Two opposing or facing surfaces of the glass plates to be cemented together are then coated with a solution of an alkyd resin. A solution of the alkyd resin which is of spraying consistency may conveniently be employed. As an example of an alkyd resin which has been particularly successful in the production of the laminated glass is mentioned the resin described and claimed in the copending case of Roy H. Kienle and Harry C. Rohlfs, Serial No. 393,119, filed Sept. 16, 1929, and entitled "Flexible alkyd resins and method of preparation", which case is assigned to the same assignee as the present application. This type of resin is flexible in its nature and is, generally speaking, the reaction product of a mixture of a polybasic organic acid, an alcohol having three or more hydroxyl groups in the molecule, a dihydric alcohol, and a dibasic aliphatic acid. In carrying out the production of the laminated glass with a resin of this character, suitable reacting quantities of, for example, phthalic anhydride, glycerine, glycol and succinic acid are reacted under proper conditions to produce a resin. This procedure is more fully set forth in the above named copending application. When the end point of the reaction is reached the resin is hot cut with a suitable mixture of butyl alcohol and butyl acetate to obtain a solution of spraying consistency. A 50—50 mixture of the solvents will be found satisfactory. The facing surfaces of the sheets or plates of glass 1 and 2 are sprayed with this resin solution to give a film 3 of suitable thickness thereon. The thickness of film may vary considerably; a suitable thickness is approximately 6 mils where the glass plate employed has a thickness of approximately 180 mils. The sprayed film is allowed to dry either at room temperature or by baking at about 90° C. for about 2 to 4 hours. The film surface must be sufficiently dry so that it is not sticky to the touch. Glass plates having a film of the resin so prepared thereon may be stored when cool in a dust proof room for subsequent use.

In accordance with the form of invention shown in Fig. 1, a sheet of the alkyd resin 4 which is partially or fully cured is placed between the two pieces or plates of previously treated glass, the film surfaces facing the resin. The plates are brought together and cushion pressed in a suitable hydraulic press after which a relatively low pressure of the order of 50 lbs. per sq. in. is applied at a temperature of about 110° C. for about 5 min. After this period the temperature is reduced to about 70 to 75° C. and at the same time the pressure is slowly increased to about 200 lbs. per sq. in. When the temperature has dropped to about room temperature, that is about 28° to 30° C., the finished product may be removed from the press.

A suitable thickness of the sheet of resin for use between the glass plates is about 30 mils, where the thickness of glass is about 180 mils. These proportions are obviously merely illustrative and are not to be taken in a limiting sense.

In the modification shown in Fig. 2, two sheets of glass each having a film of the alkyd resin sprayed thereon and treated as above noted, are cemented together using the same conditions of temperature and pressure as in the case of the form shown in Fig. 1. In this case the film may be built up if desired. For example, after a film of resin approximately 6 mils in thickness has been applied and treated as above described another film of the same thickness may be applied, and so any desired thickness of film up to about 25 mils may be successfully employed in accordance with the manufacture of the laminated glass structure of this particular form.

In the form shown in Fig. 3 the glass plates are treated by casting a film of the hot alkyd resin 5 over the facing surfaces after which the resin is cured by subjection to a temperature of about 125–150° C. At the time of casting the resin the glass plates should be at least 25 to 30° C. less that of the casting resin to prevent fracturing or breaking of the glass. After curing, the surfaces are sprayed with a very thin solution of the alkyd resin or with any other suitable sticker 6 which has a slight softening action on the surface of the cured resin causing adhesion. An example of a suitable sticker which may be used in this connection is a solution of suitable consistency of a resin of the type set forth in the patent to Edward S. Dawson, Jr., No. 1,141,944, dated June 8, 1915. The molding operation is carried out as described above in connection with the form shown in Fig. 1.

In the modification shown in Fig. 4 one of the glass plates as, for example, that designated by the numeral 1, is treated by casting a film of the hot alkyd resin 5 over the surface facing the glass plate 2, the resin being subsequently cured at a temperature of about 125 to 150° C. The facing surface of the other glass plate 2 is sprayed with a solution of the alkyd resin 3 as described in connection with the form shown in Fig. 1 or with any other suitable sticker. The two plates are then assembled and molded as described above.

In the form shown in Fig. 5 a sheet of the alkyd resin is treated on both sides thereof with a spray of the alkyd resin solution, or dipped therein, allowed to dry at room temperature until it is not sticky to the touch, and then sandwiched between the two plates of glass and molded as described above.

In Fig. 6 there is diagrammatically shown the finished product, the intermediate layer 7 being representative of the alkyd resin cementing agent and the different forms it may take as more specifically described in connection with the forms shown in Figs. 1–5 inclusive.

The laminated glass structure, according to the methods outlined, is strong and securely cemented together. It is free of bubbles and presents no obstruction to visibility therethrough. In fact, due to the nature of the alkyd resin the transparency of the glass is in no way affected. Alkyd resins being transparent to ultra violet light suffer no deterioration due to actinic rays of the sun; nor has heat any deteriorating effect on the laminated glass so prepared.

While the invention has been illustrated by showing the laminated glass structure as comprising two sheets of glass cemented or united together with the cementing agent, it will be obvious that the invention is not limited to the use of the two sheets of glass but that any number of glass sheets or plates may be united in accordance with the methods outlined.

What I claim as new and desire to secure by Letters Patent of the United States, is:—

1. A laminated glass structure comprising a plurality of sheets of glass, a sheet of flexible alkyd resin firmly uniting said glass sheets, said flexible alkyd resin being the reaction product of a polybasic organic acid, an alcohol having three or more hydroxyl groups in the molecule, a dihydric alcohol, and a dibasic aliphatic acid.

2. A laminated glass structure comprising a plurality of sheets of glass, a sheet of alkyd resin firmly uniting said glass sheets, said alkyd resin being the reaction product of phthalic anhydride, glycerine, glycol and succinic acid.

3. A laminated glass structure comprising a plurality of sheets of glass, a sheet of flexible alkyd resin between the sheets of glass, the surfaces of said glass sheets facing said sheet of resin being coated with a film of said flexible resin, said flexible resin being the reaction product of phthalic anhydride, glycerine, glycol and succinic acid, the entire structure being firmly united to form a clear transparent product.

4. The process of producing laminated glass which comprises spraying a solution of alkyd resin on the facing surfaces of a plurality of glass sheets, the resin being the reaction product of phthalic anhydride, glycerine, glycol and succinic acid, inserting between said sheets of glass a sheet of this resin in the partially or completely cured state, and molding the composite structure as follows; first, applying a cushioning pressing action, then pressure of about 50 lbs. per sq. in. at about 110° C. for about 5 minutes, then reducing the temperature to about 70–75° C. and at the same time increasing the pressure to about 200 lbs. per sq. in.

In witness whereof, I have hereunto set my hand this 17th day of January, 1930.

HARRY C. ROHLFS.